United States Patent [19]

Krins et al.

[11] Patent Number: 6,106,745
[45] Date of Patent: *Aug. 22, 2000

[54] METHOD OF MAKING GRADED INDEX POLYMERIC OPTICAL FIBERS

[75] Inventors: Bastiaan Krins, Dieren; Richard Hendrikus Gerrit Brinkhuis, Zwolle, both of Netherlands

[73] Assignee: Akzo Nobel NV, Arnhem, Netherlands

[ * ] Notice: This patent issued on a continued prosecution application filed under 37 CFR 1.53(d), and is subject to the twenty year patent term provisions of 35 U.S.C. 154(a)(2).

[21] Appl. No.: 09/076,934

[22] Filed: May 13, 1998

Related U.S. Application Data

[63] Continuation of application No. PCT/EP96/05371, Nov. 28, 1996.

[30] Foreign Application Priority Data

Nov. 30, 1995 [EP] European Pat. Off. ............... 95203295

[51] Int. Cl.[7] ...................................................... B29D 11/00
[52] U.S. Cl. ......................... 264/1.27; 264/1.28; 264/1.29
[58] Field of Search .................... 264/1.1, 1.24, 264/1.27, 1.28, 1.29, 1.38

[56] References Cited

U.S. PATENT DOCUMENTS

| | | |
|---|---|---|
| 4,822,122 | 4/1989 | Yamamoto et al. . |
| 5,382,448 | 1/1995 | Koike et al. . |
| 5,555,525 | 9/1996 | Ho et al. ................................ 264/1.29 |

FOREIGN PATENT DOCUMENTS

| | | |
|---|---|---|
| 451266 | 10/1991 | European Pat. Off. . |
| 496893 | 8/1992 | European Pat. Off. . |
| 615141 | 9/1994 | European Pat. Off. . |
| 447548 | 1/1996 | European Pat. Off. . |
| 527239 | 9/1996 | European Pat. Off. . |
| 58-31306 | 2/1983 | Japan .................................... 264/1.29 |
| 1-232305 | 9/1989 | Japan .................................... 264/1.29 |
| 3-107904 | 5/1991 | Japan .................................... 264/1.29 |
| WO 96/36478 | 11/1996 | WIPO . |

OTHER PUBLICATIONS

Derwent Patent Abstract 96–256264/26 (1996).
Derwent Patent Abstract 86–199901/31 (1986).
Abstract of JP 54/030301 (1979).
Derwent Patent Abstract 96–256261/26 (1996).
Derwent Patent Abstract 96–256258/26 (1996).
Derwent Patent Abstract 96–256259/26 (1996).
Derwent Patent Abstract 94–257632/32 (1994).
Abstract of JP 2/033104 (1990).
Derwent Patent Abstract 91–098314/14 (1991).
Derwent Patent Abstract 15262Y09 (1977).
Patent Abstract for JP56/037521 (1981).
Derwent Patent Abstract 89–353291/48 (1988).
W.C. Chen et al., "Preparation of Gradient–Index (GRIN) Polymer Fibers for Imaging Applications", J. of Polymer Science, vol. 60, pp. 1379–1383 (1996).
B.C. Ho et al., "Gradient–Index Polymer Fibers Prepared by Extrusion", Polymer Journal, vol. 27, No. 3, pp. 310–313 (1995).
R.W. Bush et al., "Comparative Rate Studies of UV–Curable Systems Using a Photocalorimetric Device", J. of Radiation Curing, Apr. 1980, pp. 20–28.
Radiation Curing—Science and Technology, S.P. Pappas, ed., Chapter 9, pp. 333–397 (1992).
Polymer Blends, D.R. Paul, ed., vol. 2, pp. 176–177.
Polymers for Lightwave and Integrated Optics—Technology and Applications, L.A. Hornak, Chapter 3, pp. 71–104.

*Primary Examiner*—Mathieu D. Vargot
*Attorney, Agent, or Firm*—Richard P. Fennelly

[57] ABSTRACT

Disclosed is a method of making a graded index polymer optical fiber comprising a multicomponent spinning process employing spinning masses comprising a core spinning mass and a sheath spinning mass, the spinning masses comprising a polymer, a polymerizable monomer, and an initiator. The monomer in the core spinning mass has a higher refractive index than the monomer in the sheath spinning mass, and the spinning masses are extruded and cured. The spinning conditions are chosen such that the monomers are substantially contained within the fiber during extrusion and curing and the total of the spinning masses is intrinsically thread forming. The spinning masses may be extruded in, e.g., water. The core and the sheath polymer may be, e.g., poly(methyl methacrylate); the core monomer may be methyl methacrylate, and the sheath monomer may be 2,2,3,3-tetrafluoropropyl methacrylate; or the core and the sheath polymer may be, e.g., poly(styrene-co-acrylonitrile); the core monomer may be benzyl methacrylate, and the sheath monomer may be methyl methacrylate. The spinning masses are solutions of the polymer in the monomer having a polymer concentration of from 20 to 70% by weight.

14 Claims, No Drawings

METHOD OF MAKING GRADED INDEX POLYMERIC OPTICAL FIBERS

The present application is a Continuation of International Application Ser. No. PCT/EP96/05371 filed Nov. 28, 1996.

(a) FIELD OF THE INVENTION

The invention pertains to a method of making polymeric optical fibers having a refractive index which gradually decreases from the center of the fiber to the periphery (a graded index polymer optical fiber). The invention also pertains to graded index polymer optical fibers so obtainable.

Graded index polymer optical fibers can be used for broadband optical transmission. In view of the increasing trend to replace electric wire transmission with optical fiber transmission, it will become necessary to provide homes and offices with optical fiber connections ("fiber to the home"). Since broadband optical fiber connections require too precise an alignment to be handled without professional skill and apparatus, interconnection means are needed in order to magnify the optical channel to home and office handling size. For this purpose graded index polymer optical fibers may be highly suitable, as they provide a relatively large bandwidth and may have a relatively large diameter.

(b) BACKGROUND ART

Graded index polymer optical fibers, and methods of making them, are known. Thus, a method of making a graded index polymer optical fiber comprising a spinning process employing spinning masses comprising a core spinning mass and a sheath spinning mass, the spinning masses comprising a polymer, a polymerizable monomer, and an initiator, wherein the monomer in the core spinning mass has a higher refractive index than the monomer in the sheath spinning mass, and wherein the spinning masses are extruded and cured, is known from Ho et al. in *Polymer Journal*, Vol. 27, 1995, pages 310–313. Ho et al. disclose a top to bottom spinning process for the preparation of a gradient-index polymer fiber by extruding a core spinning mass containing poly(methyl methacrylate) and benzyl methacrylate and a sheath spinning mass containing poly (methyl methacrylate) and methyl methacrylate into an enclosed diffusion zone which is maintained at 80° C. and subsequent UV curing. The speed of this spinning process is up to 2.5 m/min. The obtained fiber, having a diameter of 1 mm, has a quadratic distribution of refractive index of only 62% of the diameter of the fiber. In the process of Chen, Ho et al. described in Journal of Applied *Polymer Science*, Vol. 60, 1996, pages 1379–1383, this fiber is subsequently extruded through a smaller orifice to remove 40% of the outermost portion of the fiber. The obtained fiber is to be used as an imaging lens. A disadvantage of the method of Ho et al. is that it fails to provide fibers with the desired refractive index profile suitable for the above-mentioned purpose. A further disadvantage of this method is that UV curing is performed using UV-C light (253 nm), which requires special precautions with respect to the safety of the work environment.

Several other methods are known which disclose the manufacture of fibers having a graded refractive index profile. European Patent Publication No. 451,266 discloses a bottom to top spinning process for the preparation of a fiber consisting of two or more layers. Polymers and monomers that are used in this method are, e.g., poly(methyl methacrylate) and methyl methacrylate, benzyl methacrylate, 2,2,3,3-tetrafluoropropyl methacrylate, and 2,2,3,3,4,4,5,5-octafluoropentyl methacrylate, or mixtures of these monomers. During diffusion volatilizing substances released from the fiber are removed by a stream of an inert gas such as nitrogen. Optical transmission elements with three or four layers and having a radius of 0.4–0.6 mm and a length of 13.5–18.4 mm are provided, which elements are used as lenses in an image transmitting array of a copying machine. The optical transmission element has a quadratic refractive index distribution in the range of 0.25–0.75 $r_o$ from the center of the element. A disadvantage of this method is that the speed of this bottom to top process is low, i.e., 0.5 m/min. Another drawback is that the evaporated monomers have to be taken care of, i.e., either processed as waste or recycled, which is detrimental to the economics of the process. It is desired to provide a fast and economical process in which the spinning occurs from top to bottom, providing a graded refractive index polymeric optical fiber having the desired refractive index distribution profile.

Similar methods and optical transmission elements are known from European Patent Publication Nos. 447,548 and 527,239. The method of European Patent Publication No. 447,548 provides an optical transmission element consisting of three or more layers and having a quadratic refractive index distribution in the range of 0.25–0.70 $r_o$ from the center of the element. This method has the same disadvantages as described above for European Patent Publication No. 451,266.

The method of European Patent Publication No. 527,239 provides a plastic graded-index transmission element consisting of three or more layers, having a radius of 0.45±0.1 mm, and possessing a quadratic refractive index distribution in the range of 0.25–0.8 $r_o$ from the center of the element. It is stated that when only a core and a sheath spinning mass mutually varying in refractive index are used, it is difficult to make a fiber having a quadratic refractive index distribution in the range of 0.25 to about 0.70 $r_o$ from the center of the fiber. Therefore, in this method, from a performed fiber an outer peripheral portion is eliminated. The resulting fibers are used as lenses in copiers and facsimiles. Apart from being a bottom to top process in which monomers are evaporated from the fiber, the handling of fibers having a radius smaller than 0.35 mm also presents a problem.

Japanese Patent Publication No. 96/ 106,016 discloses a method of manufacturing a plastic optical fiber which can be used as an optical information communication medium. Each spinning solution comprises a polymer, a polymeric monomer, and a nonpolymeric compound. The addition of the non-polymerizable compound to the spinning solution is essential for obtaining a continuously distributed refractive index. This process suffers from the same drawbacks as described above for European Patent Publication No .451, 266. It is a bottom to top process and the non-polymerizable compound is partially volatilized. A further disadvantage of this process is that the non-polymerizable compound remains in the fiber as a plasticizer and may lead to instability as a result of further diffusion of the low-molecular weight compound. Similar methods have been disclosed in Japanese Patent Publication Nos. 96/106,013 and 96/ 106, 014.

Further, a method comprising a bicomponent spinning process employing a core spinning mass and a sheath spinning mass is disclosed in Japanese Patent Publication No. 94/ 186,441. A refractive index distribution type plastic optical transmission body is produced by discharging a polymer monomer mixture determined by a 50–90% conversion from the outside discharge hole of a nozzle plate with a double concentric discharge hole, while simultaneously discharging a monomer mixture or a polymer monomer mixture of conversion 50% or less from the inside discharge hole. The latter mixture contains a non-polymerizable colorless transparent compound with a high refractive index, such as benzyl butyl phthalate. Said mixtures are discharged to produce a core--sheath composite rod. The high refractive index compound is diffused from the mixture in the inner layer (the core mixture) into the mixture in the outer layer (the sheath mixture). Further polymerization of the discharged rod results in an optical transmission body with a refractive index distribution which continuously decreases from the center toward the periphery. To prepare an optical fiber from the rod, the rod is drawn to the desired fiber diameter.

A disadvantage of this method is its multi-stage character. The separate steps of discharging a rod, post-polymerizing the rod, and drawing it to a fiber, make for an inherently not fully economical process. Also, the step of forming the graded index rod is slow. It is desired to provide a process which yields a fiber directly, i.e., without first having to form a rod to be drawn. It is further desired that such a process be a one-step, preferably continuous process.

Apart from its objectionable multi-stage character, this process has a further drawback in that the non-polymerizable high refractive index compound, which is miscible with the sheath and core polymers, remains in the system as a plasticizer. Further, the presence of such a low-molecular weight compound means that the eventual optical fiber may be prone to temperature induced instability as a result of further diffusion of the low-molecular weight compound. It is therefore desired to provide a graded index polymeric optical fiber where the refractive index distribution is fixed in the polymer.

Methods of providing polymeric optical fibers where the refractive index distribution in the eventual fiber is not determined by the presence of a low-molecular weight compound are known.

In this respect, Japanese Patent Publication No. 90/33,104 is referred to which discloses a method of making a graded index polymer optical fiber, again by means of bicomponent spinning of a core and a sheath spinning mass. The sheath is spun from a mixture of a polymer, e.g, poly(methyl methacrylate), and a monomer, e.g., methyl methacrylate. The core is spun from a high refractive index monomer, e.g., phenyl methacrylate. After having been discharged through a bicomponent spinning nozzle, the spun core-sheath filament is passed through a heated tube to effect diffusion and then subjected to UV irradiation to effect photopolymerization. Thus, a core-sheath optical fiber is formed in which, due to diffusion of the methyl methacrylate and phenyl methacrylate monomers, a refractive index distribution is attained. The index distribution is fixed in a polymeric structure as a result of the polymerization.

This process is not carried out at the desired rate either, typical residence times in the heated tube and during irradiation being about three minutes each. Further, the process has a drawback in that the core does not contribute to the filament forming.

In Japanese Patent Publication No. 91/42,604 a different method is disclosed. Here, a graded index polymer optical fiber is made by bicomponent spinning, the core material comprising a polymer-monomer mixture and the sheath material being a low refractive index polymer, e.g., poly (tetrafluoropropyl methacrylate). This method also requires a too long process time, again involving a heated tube and UV irradiation.

For carrying out the methods described in Japanese Patent Publication Nos. 90/33,104 and 91/42,604, a bicomponent spinning apparatus is used in which the spinning masses are discharged from the bottom to the top. For the sake of practicality it is desired to provide a process for making graded index polymer optical fibers in which the introduction of the refractive index distribution is sufficiently fast to allow normal spinning (in which a spinning mass is discharged from the top to the bottom of the spinning apparatus).

Several other methods of making graded index polymer optical fibers have been disclosed in the art. Thus, Japanese Patent Publication No. 77/5857 pertains to a method in which a rod is formed by incompletely polymerizing a high refractive index monomer (diallyl phthalate). A monomer having a lower refractive index (methyl methacrylate) is diffused into the rod under simultaneous polymerization. A similar method is disclosed in Japanese Patent Publication No. 81/37521. A partially polymerized high refractive index polymer is placed in a monomer which is in the gaseous phase, and this then diffuses into the polymer with further polymerization taking place.

Japanese Patent Publication No. 88/94,228 discloses a method wherein a high and a low refractive index spinning mass containing a polymer, a vinyl monomer, and a photo-sensitizer are mixed and spun into a coaxial multilayer graded index optical fiber, with part of the vinyl monomer being evaporated from the spun fiber. This method is not based on diffusion of monomers with different refractive indices.

European Patent Publication No. 615,141 describes a method comprising melting a transparent polymer, injecting into the central portion of said melt a transparent and diffusible material having a refractive index different from that of said transparent polymer or a material containing said transparent and diffusible material and a transparent polymer, and performing an extrusion melt molding to form a plastic optical transmission medium. In this method, neither the core nor the sheath spinning mass comprises a polymer as well as a polymerizable monomer.

In Japanese Patent Publication No. 79/30301 two different monomers are heterogeneously copolymerized so as to form a gradient in the monomer composition. In Japanese Patent Publication No. 86/130904 a mixture of monomers having different refractive indices is subjected to curing from the outside. The monomer mixture on the inside becomes enriched with the higher refractive index monomer.

In European Patent Publication No. 208,159 a polymer monomer mixture is extruded, the monomer being volatile and having a relatively high refractive index. Vaporization from the outside leads to the core having a higher refractive index monomer than the sheath. A similar method using a vinylidene fluoride type resin and a methacrylate type monomer has been disclosed in Japanese Patent Publication No. 96/106,019.

In European Patent Publication No. 496,893 a poly (methyl methacrylate) tube is made and filled with a monomer mixture of methyl methacrylate and benzyl methacrylate. A graded index rod is formed by rotating the tube (about 20 hours) under polymerization conditions. The rod is drawn to a graded index polymer optical fiber. Also in European Patent Publication No. 497,984 a polymeric tube is made and filled with monomer. A rod having a graded index of refraction results from diffusion. A graded index polymer optical fiber is drawn from the rod.

All of these background art disclosures are unattractive methods which do not satisfy the aforementioned desires.

The invention seeks to overcome the above problems and to provide an efficient method of making a graded refractive index polymer optical fiber which can be carried out as a fast continuous spinning process (preferably even up to 10 m/min or faster) and which provides an optical fiber having the desired round shape and refractive index profile.

(c) DISCLOSURE OF THE INVENTION

1. Summary

In order to meet these and other objectives, the invention resides in a method of making a graded index polymer optical fiber comprising a spinning process employing spinning masses comprising a core spinning mass and a sheath spinning mass, the spinning masses comprising a polymer, a polymerizable monomer, and an initiator, wherein the monomer in the core spinning mass has a higher refractive index than the monomer in the sheath spinning mass, and wherein the spinning masses are extruded and cured, which method is characterized in that the spinning conditions are chosen such that the monomers are substantially contained within the fiber during extrusion and curing and the total of the spinning masses is intrinsically thread forming.

2. Detailed Description

Bi- and multicomponent spinning processes are known to the person of ordinary skill in the art. A description of the basic principles can, for example, be found in D. R. Paul and S. Newman, *Polymer Blends*, Chapter 16: Fibers from Polymer Blends, pages 176–177. In bicomponent spinning processes generally the core and sheath spinning masses are extruded simultaneously through a spinneret, the core-sheath configuration being attained either by means of the shape of the spinneret (e.g., having orifices with two concentric holes) or by means of a tube through which the core spinning mass is extruded placed just in advance of a regular spinneret.

In the process of the invention, the refractive index distribution develops from a clear stepwise distribution just after the spinning masses have passed the spinneret to the desired gradual decrease from the center of the core to the periphery of the sheath. For, just after passage of the spinning points (which in the preferred top to bottom spinning process will be just underneath the spinneret), the refractive index distribution is determined by the refractive index difference between the two spinning masses. This starting difference of the refractive indices of the core and sheath spinning masses will generally be of the order of 0.01 to 0.1. It is preferred for this difference to be relatively large, as this provides the largest numerical aperture, and the greatest degree of freedom in determining the eventual steepness of the distribution, while retaining an adequate process rate.

The extrusion of both spinning masses leads to the continuous formation of a thread (in this case an optical fiber). At a fixed point of the formed thread, the diffusion of the higher and lower refractive index monomers will lead to the core becoming richer in lower index monomer and poorer in higher index monomer, while the reverse holds for the sheath. Thus, upon further propagation of the extruded filaments, what was the stepwise distribution just after the spinning points more and more becomes a gradual distribution. Should the diffusion process be allowed to proceed freely, then eventually the refractive index difference between core and sheath would be flattened out.

In order to have the desired refractive index distribution become fixed in the polymeric fiber, the monomers are made to polymerize or copolymerize into polymers. To this end, it is desired that both the core and the sheath spinning mass comprise a polymerization initiator, preferably a UV initiator. A preferred UV initiator comprises 2,4,6-trimethyl benzoyl diphenyl phosphine oxide (Lucirin TPO), since this compound possesses a high efficiency. Where polymerization has taken place, the diffusion of monomers is inhibited. In actual practice there may be a difference in curing over the diameter of the fiber. For the man skilled in the art it is common general knowledge how to avoid this by the proper combination of type and concentration of initiator. With proper selection of the spinning rate and the UV irradiation duration, the process can be carried out in such a manner that completion of the polymerization coincides with the point in time at which the desired refractive index distribution has been achieved.

As regards producing a thread having the desired round shape and a tailored refractive index distribution, choosing such spinning conditions that the monomers are substantially contained within the fiber during extrusion and curing and using a total of the spinning masses which is intrinsically thread forming has been found to give an unexpected, highly positive effect. In the cited background art disclosures a fiber can be spun only after evaporation of monomers from the sheath spinning mass. As a result there is poor control over the diffusion process of the monomers in terms of reproducibility and refractive index profile. In the present application, substantially means that at least 95% of the monomers are contained within the fiber.

It is preferred that at least 97% of the monomers be contained within the fiber. More preferably, at least 99% of the monomers are contained within the fiber. It is preferred most to have the monomers completely contained within the fiber. Containment of the monomers within the fiber during extrusion can be achieved in various ways. The spinning masses can be extruded into an inert gas atmosphere, for example nitrogen, which is saturated with one or more of the monomers that are used in the spinning masses. Preferably, the inert gas atmosphere is saturated with the monomer or monomers of the sheath spinning mass. It is preferred that the spinning masses be extruded into an inert liquid. By "inert" is meant that the liquid does not mix, dissolve, coagulate or react with the monomers. Suitable inert liquids include water, and di- and triethylene glycol. Extrusion into water is particularly preferred. A further effect of extruding into an inert liquid, which can be attained if the inert liquid has a density about equal to that of the extruded gel, is that the spinning rate can be tailored more satisfactorily since gravity effects are neutralized and the spinning of masses having a lower melt strength is made possible.

One other way of achieving that the monomers are substantially contained within the fiber is choosing a monomer or monomers with a high boiling point (bp), i.e., having a boiling point of more than 50° C. above the spinning temperature. Preferably, the monomer or monomers have a boiling point which is more than 100° C. above the spinning temperature. It is preferred that at least the sheath monomer be a high-boiling monomer. Suitable high-boiling monomers are 2,2,3,3,-tetrafluoropropyl methacrylate (bp 69–70° C./51 mm) and 2,2,3,3,4,4,5,5-octafluoropentyl methacrylate (bp 87–88° C./40 mm). The skilled person will have no problem in choosing other spinning conditions in order to achieve that the monomers are substantially contained within the fiber; one other way, for instance, is to provide the fiber with a polymeric skin during extrusion.

By an intrinsically thread forming total of the spinning masses is meant that the total spinning solution as such forms a thread without the necessity, as in the prior art, of evaporating monomer. In order to achieve that the total of the spinning masses forms a thread, it is necessary that at least one of the spinning masses is an intrinsically thread forming spinning mass. In this case it is of course of importance that the volume ratio of the spinning masses is chosen such that the total of the spinning masses forms a thread. It is preferred that each spinning mass forms a thread. The ability of a spinning solution to form a thread depends on the molecular weight of the polymer, the chosen polymer and monomer, and the desired concentration of the polymer in the polymer-in-monomer solution. The ability of a polymer-in-monomer solution to form a thread is determined by a spinning experiment performed at a temperature of 85° C. or lower, using a capillary with a diameter of 1 mm, extrusion into water, and using a speed of 1.0 ml/min.

For a given system of polymers, monomers, UV initiator, and wavelength of irradiation, the person of ordinary skill in the art can thus determine the conditions for making graded index polymer optical fibers without undue experimentation. Further disclosure of the variations that can be made within the scope of the invention follows hereinafter.

An important variable is the polymer concentration in the spinning masses. If the core and sheath spinning masses have a polymer concentration which is sufficiently low, the rate of diffusion of both the high refractive index monomer and the low refractive index monomer will be high enough not to limit the spinning process rate. Surprisingly, with the method of the invention it has been found possible to obtain a process in which diffusion takes place at such a high rate that the graded index polymer optical fibers can be produced in a continuous spinning process at a rate of approximately 5.5 m/min. To this end, the core and sheath spinning masses are solutions of the polymer in the monomer having a polymer concentration of from 20 to 70% by weight. A high rate of diffusion being most advantageous, it is preferred that the polymer concentration be within a range of from 30 to 60 wt. %.

In both the core and the sheath spinning mass the combination of a polymer and a monomer not only leads to the unexpectedly high process rates that are attainable, it also has the advantage that, even at high spinning rates, filaments of sufficient sturdiness can be formed.

In order to obtain a graded index polymer optical fiber having optimum properties in respect of optical transmission, the core and sheath polymers are desired to be chemically identical. Preferably, they will also be the same physically. More preferably, they will have the same concentration in the core and sheath spinning mass. Apart from positively affecting the final properties of the fiber, this also makes for a surprisingly simple and convenient process. For, with the core and sheath polymers being the same, the refractive index differences in the core and sheath spinning masses (and thus in the final graded index polymer optical fiber) are determined by the monomer selection only. Preferably, this difference is of from 0.01 to 0.1.

Within the framework of this description, the refractive index of a monomer is considered to be proportional to the refractive index of the corresponding homopolymer. The refractive index of the interpolymers that result from the copolymerization of the high and low index monomers in combination with the original polymers is proportionally related to the amount of each monomer incorporated into such interpolymers.

It is further preferred for the monomer in one of the two spinning masses to be corresponding to the polymer comprised in the same spinning mass. While this does not exclude that in each of the spinning masses the monomer and the polymer correspond, and that the core and the sheath thus comprise a different polymer, it is preferred, in order to avoid a stepwise refractive index distribution, that the polymers be the same, and for either the core spinning mass or the sheath spinning mass to contain the corresponding monomer.

For reasons of processability, cheap high-molecular weight availability, and good optical properties, it is preferred that the polymer in both the core and the sheath spinning masses be poly(styrene-co-acrylonitrile) or poly (methyl methacrylate). In the former case it is further preferred that the sheath monomer be methyl methacrylate and the core monomer have a higher refractive index than methyl methacrylate. The monomer in that case preferably is an acrylic monomer. Examples of higher index acrylic monomers are benzyl methacrylate, phenyl methacrylate, 1-phenylethyl methacrylate, 2-phenylethyl methacrylate, furfuryl methacrylate, and 2-chloroethyl acrylate. Benzyl methacrylate is preferred most. If the polymer in both the core and the sheath spinning masses is poly(methyl methacrylate), it is further preferred that the core monomer be methyl methacrylate and the sheath monomer have a lower refractive index than methyl methacrylate, preferably 2,2,3,3-tetrafluoropropyl methacrylate. Surprisingly, with the method of the invention it has proved possible to obtain polymeric optical fibers which have a quadratic distribution of refractive index of 89% of the diameter.

It should be noted that suitable optical polymers and corresponding or analogous higher and lower refractive index monomers are known to the person of ordinary skill in the art. Thus, graded index materials and components have been described by Y. Koike in *Polymers for lightwave and integrated optics*, L. A. Hornak ed., Chapter 3, pp. 71–104.

If it is desired to make graded index polymer optical fibers for use in the near-infrared region (near-IR), optical attenuation caused by the absorption of light by overtones of the vibrational frequencies of hydrogen atoms-containing bonds, especially O—H, N—H, C—H, should be avoided as much as possible. This can be achieved by replacing the hydrogen atoms with heavier elements. Also, in other wavelength regions, the replacement in polymeric light guides of hydrogen atoms by heavier elements may bring about a favorable widening of the frequency ranges in which absorption minima are to be found.

Mostly, however, the graded index polymer optical fibers of the invention will be used with visible light. This has advantages in the case of optical fiber connections being made in-house. Further, the preferred material, poly(methyl methacrylate) is mostly used with visible light, as it has an absorption minimum in that region.

As hydrogen replacing elements at any rate preference is given to fluorine and/or chlorine, since these may be used to further tune the refractive index. These elements have contrasting individual effects: while fluorine may cause a sharp lowering of the refractive index; chlorine causes it to become higher. Examples of such halogenated monomers are 2,2,3,3,-tetrafluoropropyl methacrylate and 2,2,3,3,4,4, 5,5-octafluoropentyl methacrylate.

For further elucidation and not limitation, there follows a description of Examples 1 and 2 according to the invention and of a Comparative Example.

Two gels were processed to a core-sheath fiber in a bicomponent spinning process. The spinning masses (gels) were prepared by dissolving the polymer(s) in the respective monomers at 80° C. with stirring. In order to avoid thermal curing, it was preferred to add an inhibitor, such as hydroquinone, benzoquinone or methoxyphenol, to the spinning masses. An initiator, such as Lucirin TPO, was added in order to be able to conduct UV curing.

The spinning equipment was provided with two plunger pumps, one for the core, and one for the sheath. The pumps were filled with the spinning masses by pouring, after which the spinning equipment was put together. From the plunger pumps, two conduits led to a bicomponent spinneret, through which a core-sheath fiber was formed. By tailoring the discharge of the plunger pumps, the composition of the fiber in terms of the volume ratio between sheath and core could be chosen as desired (e.g. of from 20/80 to 80/20). In commercial practice, continuous dosing systems would be preferred to the plunger pumps.

Upon spinning, the formed thread was surrounded by a glass tube containing, for example, nitrogen gas saturated with one or more of the monomers used. Preferably, the glass tube contained an inert liquid, such as water. After a predetermined distance (over which diffusion of monomers takes place) a curing section was provided comprising a number of UV sources, the radiation of which preferably was of from 300 to 450 nm. The emission more preferably was of from 350 to 400 nm, as these wavelengths had a favorable penetration depth, and suitable initiators were available. Employed was, e.g., Philips TL/10 (340–400 nm).

It should be noted that the ideal situation is that in a first stage diffusion took place in order to form the desired refractive index profile, and in a second stage this profile was fixed by UV-curing. In practice, however, these stages will generally overlap, since the rate of curing is of the same order of magnitude (seconds) as the rate of diffusion. The man skilled in the art will be able to determine, without undue experimentation, and using his due skill with regard to curing over relatively large distances (thick layers, large diameters, i.e. mm scale rather than thin films of nm scale), the point in time at which curing should commence so as to obtain the desired refractive index profile. In this respect, *J. Rad. Curing*, 1980, 7(2), p. 20 is referred to, as well as J. G. Woods, "Radiation curable adhesives," in *Radiation Curing: Science and Technology* (S. P. Pappas, ed.), Plenum Publishers, New York, 1992, Chapter 9.

After curing, the thus consolidated graded index optical fiber was removed from the extrusion medium and wound.

EXAMPLE 1

A solution of poly(styrene-co-acrylonitrile) (SAN) (trade name: Lustran 32 of Monsanto, Mw=200,000 as measured by HPLC) in methyl methacrylate (MMA) with a concentration of 50.0 wt. % was made. The solution contained 50 ppm hydroquinone as an inhibitor of thermal polymerization and 1.0 wt. % 2,4,6-trimethyl benzoyl diphenyl phosphine oxide (Lucirin TPO of BASF) as a UV-initiator. In the same way a second solution of SAN (Lustran 32) in a mixture of benzyl methacrylate (BZMA) and MMA (70/30 by weight) with a concentration of 48.2 wt. % was made.

In a spinning experiment two high-pressure syringe pumps were filled with these solutions. The two pumps were connected to a bicomponent spinneret. The spinning temperature was 75° C. A bicomponent fiber with the solution in MMA in the sheath, and the solution in BzMA/MMA in the core, was spun through a capillary of 1 mm in diameter into a bath containing water. The extrusion speed was 1.2 m/min, the volume ratio of skin to core was 50:50. The take up speed was 5.5 m/min.

Below the spinneret a diffusion section was created with a length of 60 cm, followed by a curing section with a length of 150 cm. The draw down took place in the diffusion section. The curing section contained 24 UV tubes, in a circle around the spinning filament, with a radiation between 350 and 400 nm. (Philips TL/10).

The resulting fiber had a quadratic distribution of refractive index of 89% of the diameter (i.e., from the center of the fiber up to 89% of the radius).

EXAMPLE 2

Example 1 was repeated, but now the spinning masses were extruded into a nitrogen atmosphere which was saturated with the monomer from the sheath spinning mass, i.e., MMA; a fiber with the same refractive index profile was obtained.

COMPARATIVE EXAMPLE

A solution of PMMA (Rbhm 7H) in MMA with a concentration of 52.4 wt. % was made. The solution contained 50 ppm hydroquinone as an inhibitor of thermal polymerization and 1.0 wt. % Lucirin TPO as a UV-initiator. In the same way a second solution of PMMA (Rohm 7H) in BzMA/MMA (70/30) with a concentration of 50.6 wt. % was made.

A spinning experiment was performed in exactly the same manner as in Example 1, with the solution in MMA in the sheath and the solution in BzMA/MMA in the core.

No fiber could be wound.

What is claimed is:

1. A method of making a graded index polymer optical fiber comprising a spinning process employing spinning masses comprising a core spinning mass and a sheath spinning mass, the spinning masses comprising a polymer, a polymerizable monomer, and an initiator, wherein the spinning masses are solutions of the polymer in the monomer having a polymer concentration of from 20% to 70% by weight and wherein the monomer in the core spinning mass has a higher refractive index than the monomer in the sheath spinning mass, and wherein the spinning masses are extruded and cured, the method comprising extruding and curing of the spinning masses with the choosing of spinning conditions such that the monomers are substantially contained within the fiber during extrusion and curing and the total of the spinning masses is intrinsically thread forming by extruding the spinning masses into an inert gas atmosphere or inert liquid and/or by choosing a sheath monomer having a boiling point of more than 50° C. above the spinning temperature.

2. The method according to claim 1 wherein the spinning masses are extruded into water as the inert liquid.

3. The method according to claim 1 wherein the sheath monomer has a boiling point of more than 100° C. above the spinning temperature.

4. The method according to any one of claims 1–3 wherein in each spinning mass the same polymer is used.

5. The method according to any one of claims 1–3 wherein the polymer is poly(methyl methacrylate).

6. The method according to claim 4 wherein the polymer is poly(methyl methacrylate).

7. The method according to any one of claims 1–3 wherein the sheath spinning mass comprises poly(methyl methacrylate) and 2,2,3,3-tetrafluoropropyl methacrylate and the core spinning mass comprises poly(methyl methacrylate) and methyl methacrylate.

8. The method according to claim 4 wherein the sheath spinning mass comprises poly(methyl methacrylate) and 2,2,3,3-tetrafluoropropyl methacrylate and the core spinning mass comprises poly(methyl methacrylate) and methyl methacrylate.

9. The method according to any one of claims 1–3 wherein the sheath spinning mass comprises poly(styreneco-acrylonitrile) and methyl methacrylate and the sore spinning mass comprises poly(styrene-co-acrylonitrile) and benzyl methacrylate.

10. The method according to claim 4 wherein the sheath spinning mass comprises poly(styrene-co-acrylonitrile) and methyl methacrylate and the core spinning mass comprises poly(styrene-co-acrylonitrile) and benzyl methacrylate.

11. The method according to claim 1 wherein the initiator is a UV initiator.

12. The method according to claim 1 wherein the UV initiator comprises 2,4,6-trimethyl benzoyl diphenyl phosphine oxide.

13. The method according to claim 1 wherein UV curing is effected by irradiation at a wavelength of from 350 to 400 nm.

14. The method according to claim 6 wherein the sheath spinning mass comprises poly(methyl methacrylate) and 2,2,3,3-tetrafluoropropyl methacrylate and the core spinning mass comprises poly(methyl methacrylate) and methyl methacrylate.

* * * * *